(12) United States Patent
Ortez

(10) Patent No.: US 6,508,478 B1
(45) Date of Patent: Jan. 21, 2003

(54) AUXILIARY WHEELED FRAME FOR WHEELBARROWS

(76) Inventor: G. Steven Ortez, 4513 Wilkinson La., Great Falls, MT (US) 59404

( * ) Notice: Subject to any disclaimer, the term of this patent is extended or adjusted under 35 U.S.C. 154(b) by 0 days.

(21) Appl. No.: 09/648,035

(22) Filed: Aug. 25, 2000

(51) Int. Cl.[7] .............................. B62B 3/00; B62B 1/00
(52) U.S. Cl. ............................ 280/47.34; 280/47.31; 280/653
(58) Field of Search .................... 280/653, 47.31, 280/47.35, 47.19, 47.26, 47.34

(56) References Cited

U.S. PATENT DOCUMENTS

| | | | | |
|---|---|---|---|---|
| 961,719 A | * | 6/1910 | Hubbard | 280/47.2 |
| 1,095,145 A | * | 4/1914 | Elterich | 280/47.2 |
| 4,052,079 A | * | 10/1977 | Lehman | 280/47.2 |
| 4,758,010 A | * | 7/1988 | Christie | 280/47.31 |
| 5,031,926 A | * | 7/1991 | Wannamaker | 280/47.2 |
| 5,415,421 A | * | 5/1995 | Godwin | 280/47.31 |
| 5,687,979 A | * | 11/1997 | Plevka | 280/47.19 |
| 6,220,622 B1 | * | 4/2001 | Garcia | 280/653 |

FOREIGN PATENT DOCUMENTS

GB 2073677 A * 10/1981 .................. 280/654

* cited by examiner

Primary Examiner—Brian L. Johnson
Assistant Examiner—G B Klebe

(57) ABSTRACT

An auxiliary wheeled frame for wheelbarrows having a lateral beam being attached to the legs of a typical wheelbarrow and having attached at a bottom outer end thereof a plurality of pivotable, rotating wheels one each attached at each exterior end of the lateral beam exterior to a position where the legs of a typical wheelbarrow normally rest on the ground. A plurality of braces are provided with the braces being either removably or permanently secured one each to an upper side of said lateral beam immediately interior of each rotating wheel and to one each of the legs of a typical wheelbarrow. A horizontal cross bar is provided with the horizontal cross bar being secured between interior portions of each of the legs of a typical wheelbarrow. The rotating wheels may be removably attached, may have brake means, and may be castor-type wheels. A plurality of second diagonal bars may be secured between interior portions of each of the legs of a typical wheelbarrow. The lateral beam may have a toolbox.

8 Claims, 2 Drawing Sheets

AUXILIARY WHEELED FRAME FOR WHEELBARROWS

BACKGROUND OF THE INVENTION

1. Field of the Invention

This invention relates to wheelbarrows, and more particularly to an auxiliary wheeled frame for wheelbarrows.

2. Description of the Related Art

The usefulness, function and usage of wheelbarrows are well known to those involved in Construction, gardening, and other activities where loads are moved and transported from one location to another. The wheelbarrow is a unique tool in that a relatively heavy load may be balanced and moved in relatively confining or inaccessible locations. Wheelbarrows are often also used to transport heavy loads over rough and difficult terrain where other means of transport are not practicable. Often repeated loads of great size in a wheelbarrow is more than the ability of the operator to safely manage utilizing only the front wheel. In such instances, additional rear support which provides for mobility of the wheelbarrow is desired and saves the operator from the repeated strain of manhandling the wheelbarrow.

Heretofore, many attempts have been made to modify wheelbarrows to assist in their unique functions. However, modifications described to address perceived problems include many different types. However, none provide for an auxiliary wheeled frame for wheelbarrows in the manner which is provided for in the present invention.

U.S. Pat. No. 5,878,827, issued Mar. 9, 1999 to Fox teaches a motorized wheelbarrow having a mounting element secured to the frame for supporting a drive engine and a drive mechanism which is operatively linked to a drive wheel.

U.S. Pat. No. 5,509,681, issued Apr. 23, 1996 to Keller teaches a kit and method for converting a wheelbarrow into a garden cart whereby a wheelbarrow is used as a towed garden cart, and having rear wheel assemblies mounted to each of the depending legs of the wheelbarrow and a front hitch plate releasably attached to the forward ends of beams adjacent a brace. The rear wheel assembly has an axle tube adapted to mount to each of the rear legs and axles bearing wheels releasably mounted within each of the axle tubes.

U.S. Pat. No. 5,489,000, issued Feb. 6, 1996 to Hillbohm teaches a motorized wheelbarrow having a wheel arranged to bear on the ground and a motor arranged to rotate the wheel for moving the wheelbarrow over the ground.

U.S. Pat. No. Des. 364,020, issued Nov. 7, 1995 to Wang teaches a wheeled dolly for golf bags.

U.S. Pat. No. 5,106,113, issued Apr. 21, 1992 to Piacentini teaches a wheel support structure for a cart having two separate wheel axis each carrying a wheel with each wheel axis being mounted on a holding arm which is pivotable about a vertical frame.

U.S. Pat. No. 5,031,926, issued Jul. 16, 1991 to Wannamaker teaches a wheelbarrow conversion kit for utilizing a wheelbarrow as a garden tractor having an elongate frame rail rotatably mounting a wheel at each end and an elongate tongue which is orthogonally mounted to the frame member whereby the frame member is secured to or adjacent the "U" shaped frame supports of the wheelbarrow.

U.S. Pat. No. 4,767,128, issued Aug. 30, 1988 to Terhune teaches a wheelbarrow construction having a receptacle unit, a forward wheel assembly, a main load support unit with adjustable handle means, a rear wheel trailer unit and an automatic brake unit. The rear wheel trailer unit has a set of swivel castor wheel assemblies operatively connected to a second frame member at the juncture of the frame member support arms with the frame member crosspiece. The operative connection between the castor wheel assemblies and the rear wheel trailer unit has a generally cylindrical housing member formed on the outboard ends of the frame member cross-piece which projects beyond the forwardly extending support arms and an upper and lower bearing assembly.

U.S. Pat. No. 4,589,508, issued May 20, 1986 to Hoover et al. teaches a motorized wheelbarrow having an engine to drive the wheel of the wheelbarrow and a friction drive transmission mechanism which allows the wheelbarrow to be driven in either a forward or reverse direction and also allows it to stand in neutral.

U.S. Pat. No. 4,061,349, issued Dec. 6, 1977 to Stahl teaches an auxiliary wheel assembly mounted on a selected portion of a wheelbarrow and includes a wheel adapted to be pivoted forwardly and secured in an elevated condition.

U.S. Pat. No. 4,052,079, issued Oct. 4, 1977 to Lehman teaches a wheelbarrow transport means having a wheelbarrow leg structure supported on a dolly which is towed by a garden tractor or the like, which dolly is provided with castor wheels.

U.S. Pat. No. 3,891,043, issued Jun. 24, 1975 to Valdex teaches a self-propelled earth moving device being a wheelbarrow having an attachable swiveling carrier and a motor attached to a mounting member below the bucket of the wheelbarrow.

U.S. Pat. No. 1,735,527, issued Nov. 12, 1929 to Cwik teaches a wheelbarrow with an auxiliary adjustable rear wheel for relieving the operator of a portion of the load.

U.S. Pat. No. 1,095,145, issued Apr. 28, 1914 to Elterich teaches a wheelbarrow having a second or trailer-wheel which tracks upon the ground and relieves the operator of the weight of the load.

None of the art as identified above, either individually or in combination, describes an auxiliary wheeled for wheelbarrows in the manner provided for in the present invention.

SUMMARY OF THE INVENTION

The goal of the present invention is to provide an auxiliary wheeled frame for wheelbarrows that does not have the drawbacks and limitations of the devices of the prior art.

An object of the present invention is to provide an auxiliary wheeled frame for wheelbarrows which is lightweight, strong, balanced, and efficient at carrying and transporting a wide range of load sizes and weights.

Another object of the present invention is to provide an auxiliary wheeled frame for wheelbarrows which is economical to produce and easily applied to a wheelbarrow.

These and other objects are achieved by providing an auxiliary wheeled frame for wheelbarrows that comprises a lateral beam being attached to the legs of a typical wheelbarrow and having attached at a bottom outer end thereof a plurality pivotable, rotating wheels one each attached at each exterior end of the lateral beam exterior to a position where the legs of a typical wheelbarrow normally rest on the ground. A plurality of braces are provided with the braces being secured one each to an upper side of said lateral beam immediately interior of each rotating wheel and to one each of the legs of a typical wheelbarrow. A horizontal cross bar is provided with the horizontal cross bar being secured between interior portions of each of the legs of a typical wheelbarrow. The rotating wheels may be removably attached, may have brake means, and may be castor-type wheels. The braces further comprise may be removably attached to the legs of a typical wheelbarrow by means of a plurality of spaced holes, nuts, and bolts, which plurality of spaced holes provide for vertical adjustment of the braces on the legs of a typical wheelbarrow, or may be permanently attached to the legs of a typical wheelbarrow. A plurality of second diagonal bars may be secured between interior portions of each of the legs of a typical wheelbarrow, which second diagonal bars are attached to the legs of a typical wheelbarrow interior and adjacent to the brace, and further attached to the legs of a typical wheelbarrow midpoint between the attachment of the bottom of the brace and the attachment of the horizontal cross bar to the leg of a typical wheelbarrow. The lateral beam may have a toolbox.

Further objects and advantages of the present invention will become apparent from the following description reference being had to the accompanying drawings wherein a preferred form of the embodiment of the present invention is clearly shown.

DESCRIPTION OF THE PREFERRED EMBODIMENT

Figure 1:
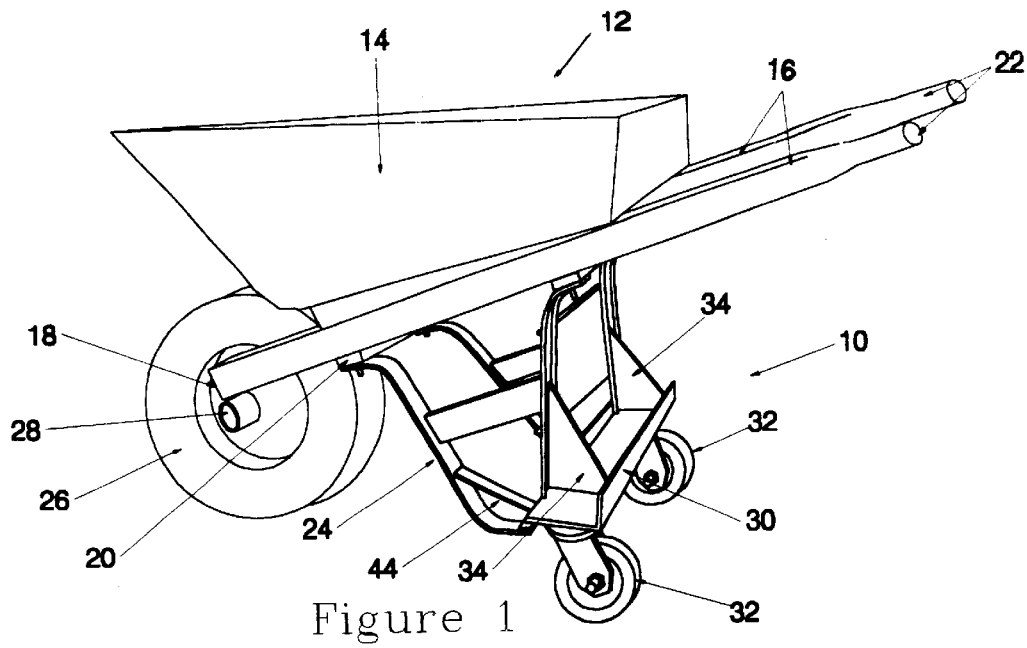
FIG. 1 is a left side elevational view of a wheelbarrow having attached an auxiliary wheeled frame for wheelbarrows according to the invention.

Referring now to the drawings, and more particularly to FIG. 1, which is a perspective view of the auxiliary wheeled frame for wheelbarrows 10 of the present invention, there is shown a standard wheelbarrow 12 having a pan 14 supported on diverging beams 16. The forward ends 18 of the diverging beams 16 are secured together by means of attachment 20. The opposite ends of the diverging beams 16 form handles 22. Generally U-shaped legs 24 depend from the diverging beams 16 adjacent the handles. A forward wheel 26 is supported on an axle 28 between the forward ends 18 of the diverging beams 16.

Figure 2:
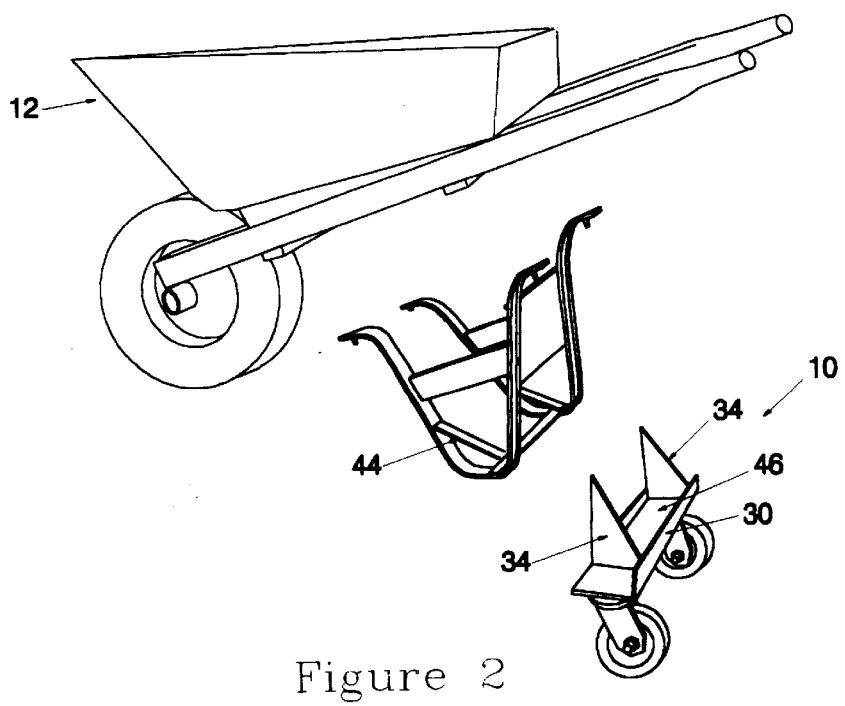
FIG. 2 is an exploded view of a wheelbarrow having attached an auxiliary wheeled frame for wheelbarrows according- to the invention of FIG. 1.

The auxiliary wheeled frame for wheelbarrows 10 of the present invention as shown in FIG. 2 comprises a lateral beam 30 to which is removably attached at each bottom outer end thereof a plurality pivotable, rotating wheels 32, one rotating wheel 32 at each exterior end thereof The rotating wheels 32 are attached at each bottom outer end of the lateral beam 30 exterior to the position where the generally U-shaped legs 24 normally rest on the ground when the wheelbarrow is resting on the ground on said generally U-shaped legs 24. Such placement of the rotating wheels 32 on the lateral beam 30 provides for greater stability of the wheelbarrow. In one embodiment, the rotating wheels 32 have brake means 32a. In one embodiment, the rotating wheels 32 are removably attached. In still another embodiment, the rotating wheels 32 are castor-type wheels.

Figure 3:
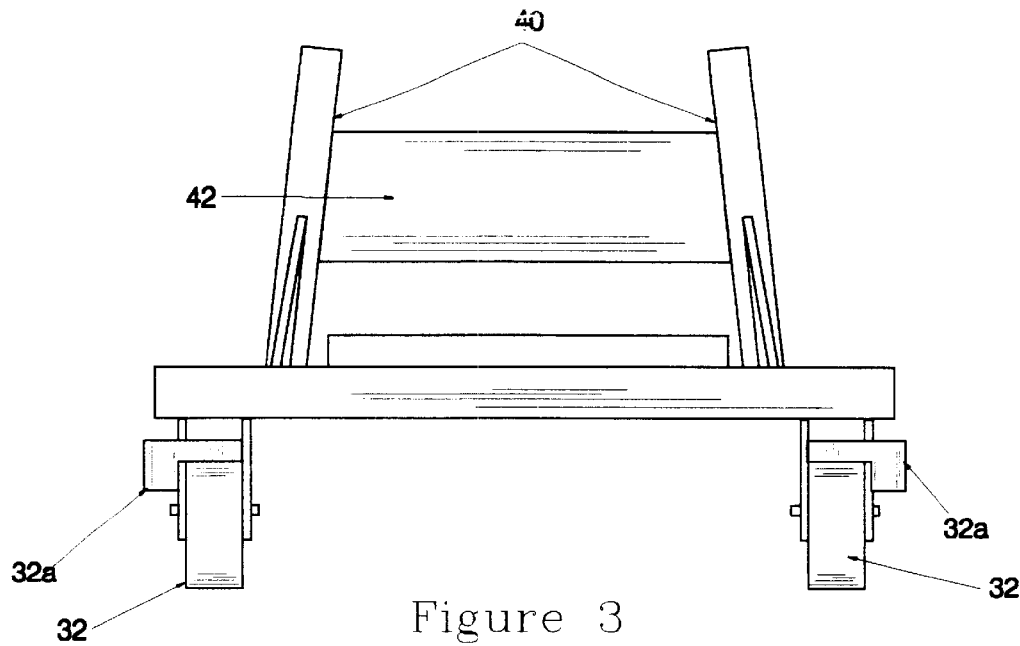
FIG. 3 is a rear view of an auxiliary wheeled frame for wheelbarrows according to the invention showing permanent attachment to the legs of a wheelbarrow.
Figure 4:
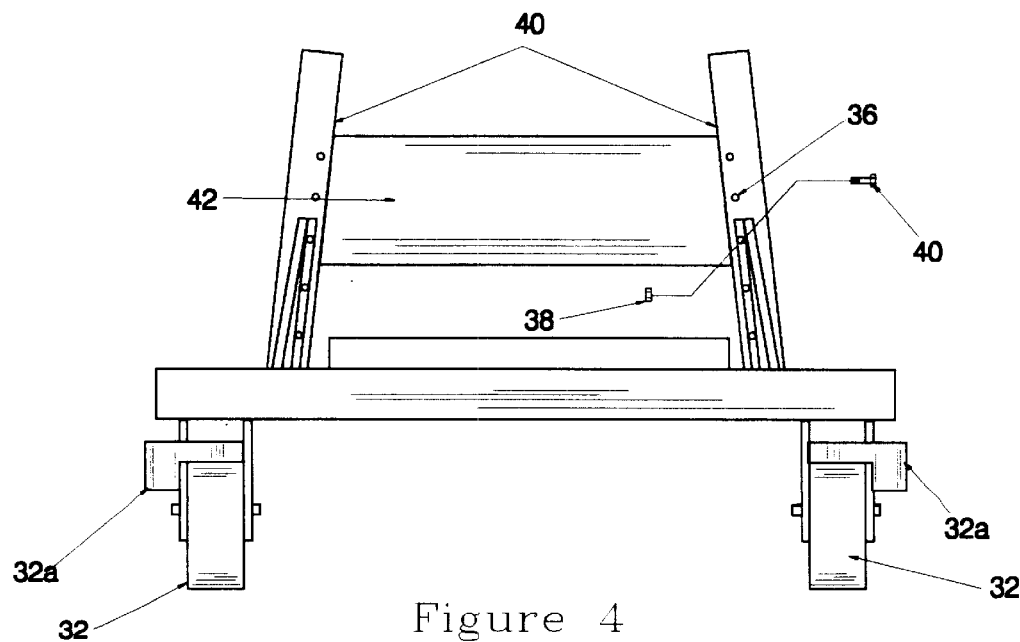
FIG. 4 is a rear view of an auxiliary wheeled frame for wheelbarrows according to the invention showing removable attachment to the legs of a wheelbarrow.

Immediately interior of each rotating wheel 32 on an upper side of the lateral beam is secured a brace 34, which braces 34 attach one each to one each of the generally U-shaped legs 24. In one embodiment as shown in FIG. 4, the braces 34 are removably attached to the generally U-shaped legs 24 by means of a plurality of spaced holes 36 and nuts 38 and bolts 40, which plurality of spaced holes 36 provide for vertical adjustment of the braces 34 on the generally U-shaped legs 24. In another embodiment as shown in FIG. 3, the braces 34 are permanently attached to the generally U-shaped legs 24, such as by welding.

Secured between the interior portions 40 of each of the generally U-shaped legs 24 is a horizontal cross bar 42, which horizontal cross bar 42 helps provide stability to the generally U-shaped legs 24. In another embodiment, a second diagonal bar 44 is secured between the interior portions 40 of each of the generally U-shaped legs 24, which diagonal bar 44 is attached to the U-shaped legs adjacent to where the bottom of the brace 34 attaches to the generally U-shaped leg 24 also midpoint between the attachment of the bottom of the brace 34 to the generally U-shaped leg 24 and the attachment of the horizontal cross bar 42 to the forwardmost leg of the generally U-shaped leg 24.

In one embodiment, the lateral beam 30 provides for a toolbox 46 attached thereto, which toolbox 46 allows for easy transport and access of tools which are necessary for the particular activity yet allows for such tools to be transported and stowed apart from the load of the wheelbarrow and off the person of the operator.

In operation and use, a wheelbarrow having attached thereto the auxiliary wheeled frame for wheelbarrows 10 of the present invention is obvious and is convenient, easy, reliable, and effective to use for all load sizes, particularly large, bulky, or heavy loads. The wheelbarrow either has the auxiliary wheeled frame for wheelbarrows 10 permanently attached, or the auxiliary wheeled frame for wheelbarrows is quickly and easily attached to the generally U-shaped legs 24. The wheelbarrow is loaded to the desired load and the wheelbarrow can be either picked-up by the handles and moved in conventional manner utilizing only the forward wheel 26, or the wheelbarrow can be moved by pushing or pulling while resting on the forward wheel 26 and the pivotable, rotating wheels 32. When the wheelbarrow is loaded and pushed or pulled while resting on the forward wheel 26 and the rotating wheels 32 of the auxiliary wheeled frame for wheelbarrows 10 of the present invention, the operator experiences no twisting of the load which can be encountered with heavy loads in a typical wheelbarrow. If the wheelbarrow is delivered to a location having an incline, and placed at rest, the brake means 32a of the rotating wheels 32 help hold the wheelbarrow at rest.

Various changes and departures may be made to the invention without departing from the spirit and scope thereof Accordingly, it is not intended that the invention be limited to that specifically described in the specification or as illustrated in the drawings but only as set forth in the claims. From the drawings and above-description, it is apparent that a wheel support structure for a wheelbarrow constructed in accordance with the invention provides desirable features and advantages. While the form of the invention herein described constitutes a preferred embodiment of the invention, it is to be understood that the invention herein is capable of further modification, and this application is intended to cover any variations, uses, or adaption of the invention, following in general the principles of the invention herein and include such departures from the present disclosure as to come within knowledge or customary practice in the art to which the invention herein pertains, and as may be applied to the essential features hereinbefore set forth and falling within the scope of the invention and method herein or the limits of the appended claims.

What is claimed and desired to be secured by United States Letters Patent is:

1. An auxiliary wheeled frame for a wheelbarrow, comprising:

a lateral beam, said lateral beam being attached to the legs of a wheelbarrow;

said lateral beam having attached at a bottom outer end thereof a plurality of pivotal, rotating wheels, said pivotal rotating wheels being one each attached at each exterior end of said lateral beam;

said pivotal rotating wheels being attached to said lateral beam exterior to a position where the legs of a wheelbarrow normally rest on the ground;

a plurality of braces, said plurality of braces being secured one each to an upper side of said lateral beam immediately interior of each pivotal rotating wheel and to one each of the legs of a wheelbarrow; and, wherein said plurality of braces further comprise being removably attached to the legs of a wheelbarrow by means of a plurality of spaced holes, nuts and bolts, which plurality of spaced holes provide for vertical adjustment of the plurality of braces on the legs of a wheelbarrow; and, a horizontal cross bar, said horizontal cross bar being secured between interior portions of each of the legs of a wheelbarrow; and, a plurality of second diagonal bars being secured between interior portions of each of the legs of a wheelbarrow, said plurality of second diagonal bars being attached to the legs of a wheelbarrow interior and adjacent to said plurality of braces, and further being attached to the legs of a wheelbarrow midpoint between the attachment of the bottom of said plurality of braces and the attachment of said horizontal cross bar to each of the legs of a wheelbarrow.

2. The auxiliary wheeled frame for a wheelbarrow of claim 1 wherein said pivotal rotating wheels further comprise being removably attached.

3. The auxiliary wheeled frame for a wheelbarrow of claim 1 wherein said pivotal rotating wheels further comprise having brake means.

4. The auxiliary wheeled frame for a wheelbarrow of claim 1 wherein said pivotal rotating wheels further comprise castors.

5. The auxiliary wheeled frame for a wheelbarrow of claim 1 wherein said plurality of braces further comprise being permanently attached to the legs of a wheelbarrow.

6. The auxiliary wheeled frame for a wheelbarrow of claim 1 wherein said horizontal cross bar further comprises being permanently attached.

7. The auxiliary wheeled frame for a wheelbarrow of claim 1 wherein said horizontal cross bar further comprises being removably attached.

8. The auxiliary wheeled frame for a wheelbarrow of claim 1 wherein said lateral beam further comprises a toolbox.

* * * * *